US011242103B2

(12) United States Patent
Lindby

(10) Patent No.: US 11,242,103 B2
(45) Date of Patent: Feb. 8, 2022

(54) FOOT REST ASSEMBLY FOR MOTORCYCLES

(71) Applicants: Lindby Custom Inc., Placentia, CA (US); Per Lindby, Placentia, CA (US)

(72) Inventor: Per Lindby, Placentia, CA (US)

(73) Assignee: Lindby Custom, Inc, Placentia, CA (US)

( * ) Notice: Subject to any disclaimer, the term of this patent is extended or adjusted under 35 U.S.C. 154(b) by 100 days.

(21) Appl. No.: 16/867,811

(22) Filed: May 6, 2020

(65) Prior Publication Data

US 2021/0347433 A1    Nov. 11, 2021

(51) Int. Cl.
*B62J 25/06*   (2020.01)
*B62K 19/30*   (2006.01)
*B62K 11/02*   (2006.01)

(52) U.S. Cl.
CPC .............. *B62J 25/06* (2020.02); *B62K 11/02* (2013.01); *B62K 19/30* (2013.01)

(58) Field of Classification Search
CPC .......... B62J 25/06; B62K 11/02; B62K 19/30; Y10T 74/20918
USPC ........................................................ 280/291
See application file for complete search history.

(56) References Cited

U.S. PATENT DOCUMENTS

| | | | | |
|---|---|---|---|---|
| 1,261,442 A | * | 4/1918 | Rigby | B62J 25/00 280/291 |
| 3,794,353 A | * | 2/1974 | Oliver | B62J 25/00 280/291 |
| D348,422 S | * | 7/1994 | Rasmusen | D12/114 |
| D365,534 S | * | 12/1995 | Malone | D12/114 |
| 6,398,393 B1 | * | 6/2002 | Perse | B62J 25/06 362/473 |
| 7,281,727 B2 | * | 10/2007 | Rogozienski | B62J 25/00 280/293 |
| 7,611,158 B2 | * | 11/2009 | Aoki | B62J 25/00 280/291 |
| D833,336 S | * | 11/2018 | McFarland | B62M 11/02 D12/114 |

(Continued)

FOREIGN PATENT DOCUMENTS

CN   104843135 A   *   8/2015
CN   105416474 A   *   3/2016

(Continued)

*Primary Examiner* — Minnah L Seoh
*Assistant Examiner* — Myles A Harris
(74) *Attorney, Agent, or Firm* — Raymond Sun

(57) ABSTRACT

A foot rest assembly for use with a motorcycle has a mounting block having a central portion, and first and second winged portions extending at an angle from each opposite end of the central portion, with each winged portion having a cylindrical housing provided at its outward end, and with each cylindrical housing having a bore extending therethrough and at least one threaded opening provided in the cylindrical housing. The assembly also includes first and second foot rests, each foot rest having a vertical bar that has a bottom end, with the vertical bar extending and being bent by about ninety degrees to a horizontal section. The vertical bar of each foot rest is inserted into a corresponding one of the bores of the cylindrical housings, and a threaded bolt is screwed into the at least one threaded opening to secure each vertical bar inside each corresponding bore.

5 Claims, 4 Drawing Sheets

(56) References Cited

U.S. PATENT DOCUMENTS

| | | | | |
|---|---|---|---|---|
| 2003/0173756 | A1* | 9/2003 | Mullins | B62J 25/00 |
| | | | | 280/265 |
| 2004/0200652 | A1* | 10/2004 | Hara | B62J 35/00 |
| | | | | 180/219 |
| 2005/0116443 | A1* | 6/2005 | Egan | B62J 25/00 |
| | | | | 280/291 |
| 2006/0219854 | A1* | 10/2006 | Sardina | B62K 19/30 |
| | | | | 248/230.1 |
| 2010/0012415 | A1* | 1/2010 | Hedtke | B62K 11/02 |
| | | | | 180/219 |
| 2010/0242244 | A1* | 9/2010 | Murakami | B62K 19/30 |
| | | | | 29/90.01 |
| 2015/0217827 | A1* | 8/2015 | Tamura | B62J 35/00 |
| | | | | 280/835 |

FOREIGN PATENT DOCUMENTS

| | | | | | |
|---|---|---|---|---|---|
| CN | 105667653 | A | * | 6/2016 | |
| CN | 106515930 | A | * | 3/2017 | |
| CN | 107310669 | A | * | 11/2017 | |
| CN | 107651078 | A | * | 2/2018 | |
| CN | 107985478 | A | * | 5/2018 | |
| CN | 108032947 | A | * | 5/2018 | |
| CN | 111268012 | A | * | 6/2020 | |
| CN | 112046660 | A | * | 12/2020 | |
| EP | 3187400 | A1 | * | 7/2017 | ............... B62H 1/02 |
| EP | 3590807 | A1 | * | 1/2020 | ............... B62J 25/06 |
| EP | 3677495 | A1 | * | 7/2020 | ............... B62K 25/20 |
| GB | 240300 | A | * | 10/1925 | ............... B62J 25/00 |
| KR | 860000150 | Y1 | * | 2/1986 | |
| KR | 860000151 | Y1 | * | 2/1986 | |
| WO | WO-2019156569 | A1 | * | 8/2019 | ............... F02B 61/02 |

\* cited by examiner

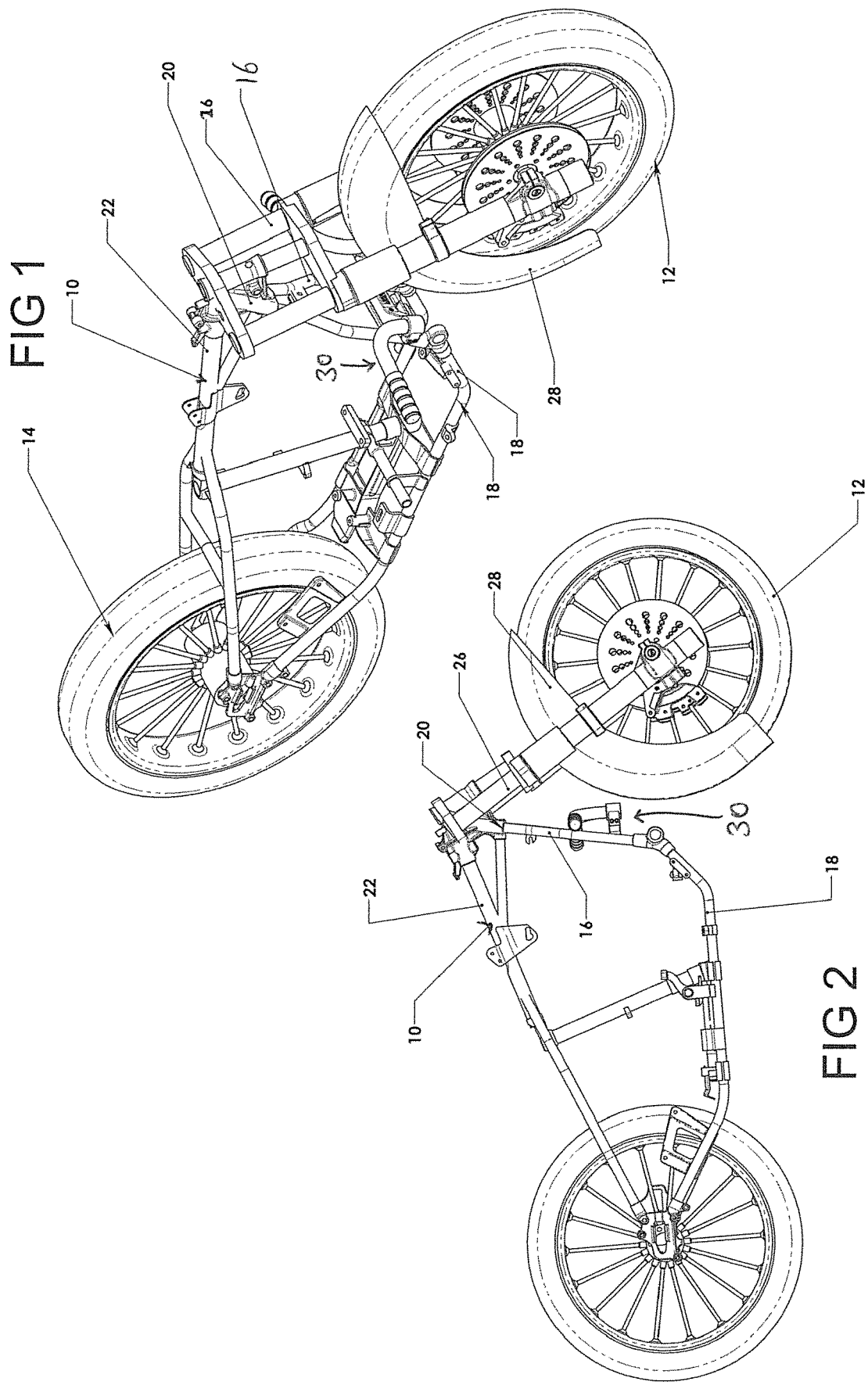

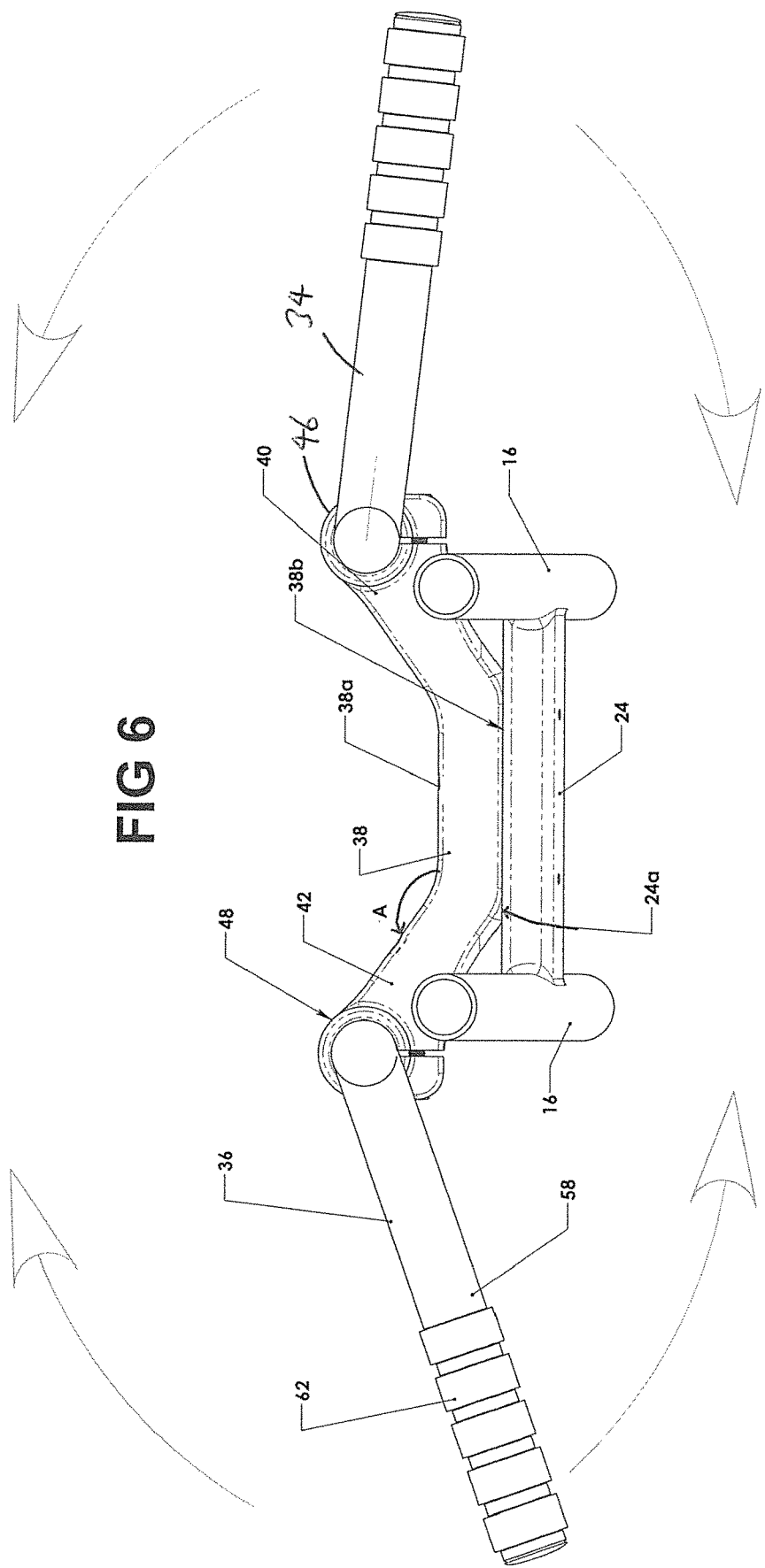

FOOT REST ASSEMBLY FOR MOTORCYCLES

BACKGROUND OF THE INVENTION

1. Field of the Invention

The present invention relates to motorcycle accessories, and in particular, to a foot rest assembly that is adapted to be installed to the frame of a motorcycle.

2. Description of the Prior Art

As is well-known, most motorcycle assemblies include a frame having a seat on which a rider sits in a straddle fashion. Foot pegs or foot rests are carried at the lower end of the frame at opposite sides thereof for the rider to place his feet when riding. Foot pegs are short shafts which project laterally from the vehicle frame. Foot pegs are the most commonly used type of footrest because of their simplicity and because, in stirrup fashion, the shaft of the peg can securely engage the heel of the rider's boot.

Existing foot rests suffer from a number of drawbacks. First, the foot rests are normally situated in close proximity to foot controls, brakes and shifters which limits the available space to move around. Second, the foot rests must be secured to a location which provides clearance to the other parts of the motorcycle frame, the fork, and the fender for the front wheel. Third, separate foot rests are usually installed on either side of the motorcycle frame to provide for independent adjustment, but are often not symmetrical, which leads to posture issues for the rider. Fourth, these foot rests extend outwardly beyond the profile of the motorcycle, which causes the motorcycle to take up a lot of space during storage.

In view of the above, a need exists for motorcycle foot rests that stay out of the way when not in use, and which do not interfere with foot controls, brakes and the shifter. It would be desirable to have unobtrusive forward foot rests that are easily deployable when they are needed. It would also be desirable to have a pair of foot rests that are symmetrical to provide proper posture to the rider.

SUMMARY OF THE DISCLOSURE

In order to accomplish the objects of the present invention, there is provided a foot rest assembly for use with a motorcycle. The foot rest assembly has a mounting block having a central portion that has opposite ends, and first and second winged portions extending at an angle from each end of the central portion, with each winged portion having a cylindrical housing provided at its outward end, and with each cylindrical housing having a bore extending therethrough and at least one threaded opening provided in the cylindrical housing. The assembly also includes first and second foot rests, each foot rest having a vertical bar that has a bottom end, with the vertical bar extending and being bent by about ninety degrees to a horizontal section. The vertical bar of each foot rest is inserted into a corresponding one of the bores of the cylindrical housings, and a threaded bolt is screwed into the at least one threaded opening to secure each vertical bar inside each corresponding bore.

BRIEF DESCRIPTION OF THE DRAWINGS

FIG. 1 is a perspective view illustrating one embodiment of a foot rest assembly of the present invention shown in use on a motorcycle.

FIG. 2 is a side view of the motorcycle of FIG. 1.

FIG. 6 is a top sectional view of the foot rest assembly of FIG. 3.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

Figure 3:
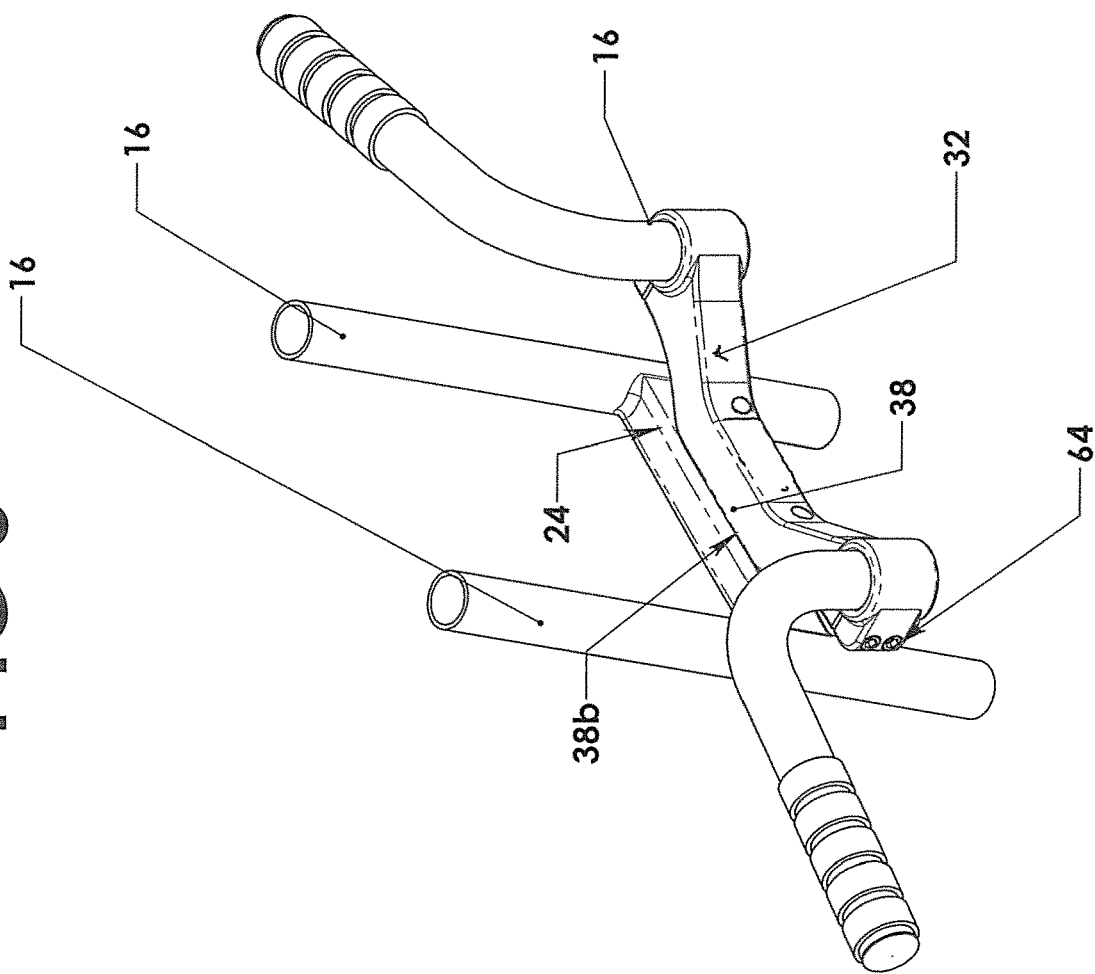
FIG. 3 is an enlarged perspective view of the foot rest assembly of FIG. 1 installed on a frame of a motorcycle.
Figure 4:
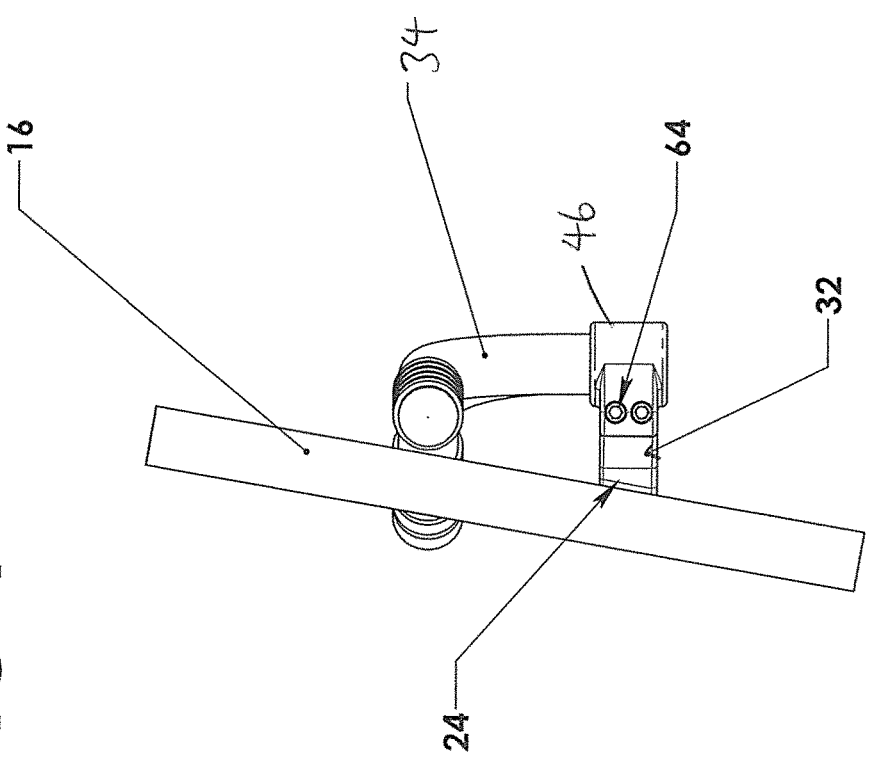
FIG. 4 is a side view of FIG. 3.
Figure 5:
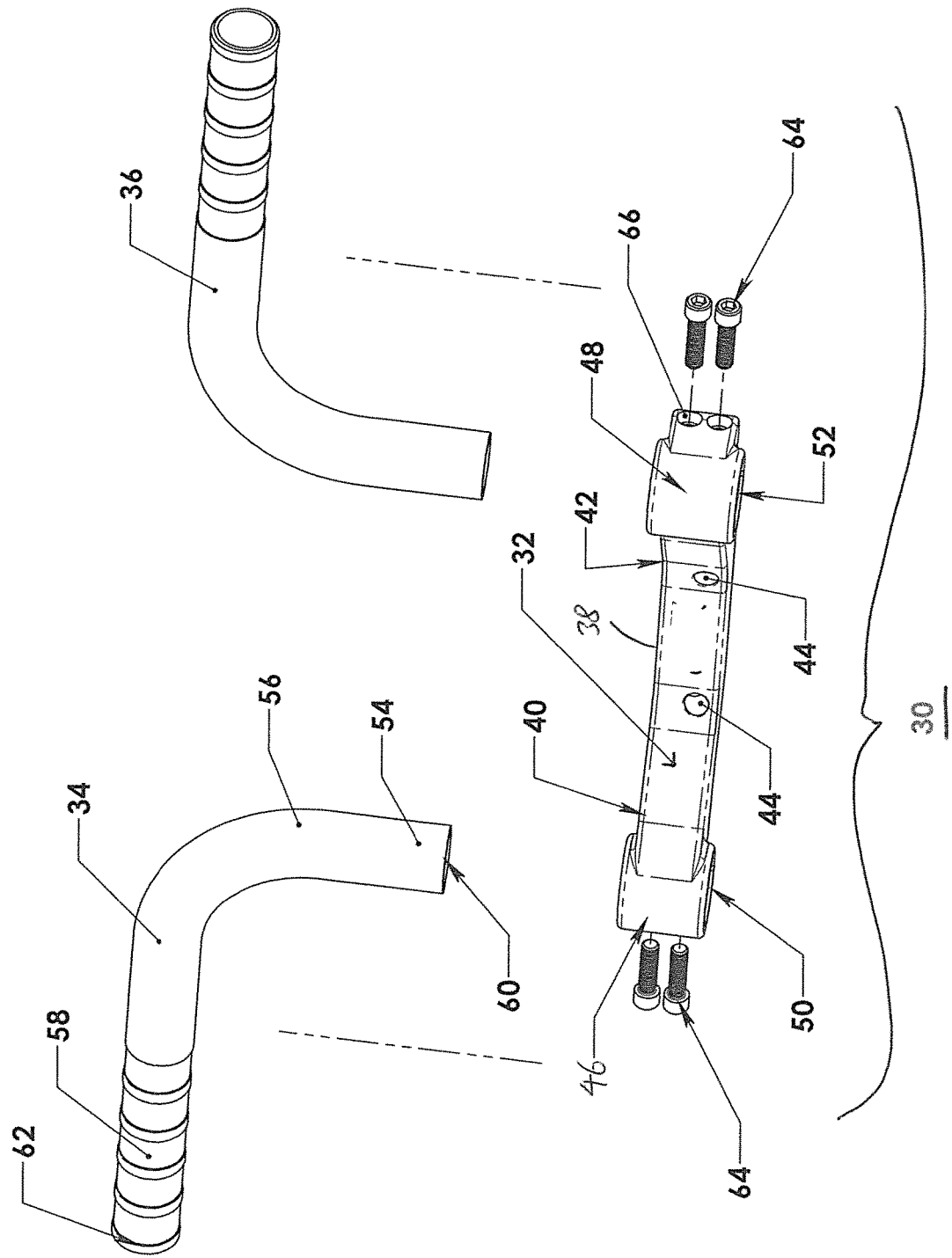
FIG. 5 is an exploded perspective view of the foot rest assembly of FIG. 3.

Referring to FIGS. 1-2, a conventional motorcycle has a motorcycle frame 10 that supports a front wheel 12 and a rear wheel 14. The frame 10 has forward end frame members 16 that extend upwardly from lower frame pipes 18. The forward end frame members 16 taper together toward the top and are held with a bracket relative to a horizontal frame member 22. A motor (not shown) is mounted on the frame members in the lower portion of the frame 10, and is used for powering the motorcycle in a normal manner. A fork retainer sleeve 20 is provided at the bracket at the front end of the horizontal frame member 22. A horizontal connecting frame member 24 extends between the two forward end frame members 16. See FIGS. 3-4. Two forks 26 are pivotably secured to the front of the frame 10 and extend to secure the front wheel 12 for rotation, and the front wheel 12 is covered inside a front fender 28 that is secured between the forks 26.

Referring also to FIGS. 3-6, a foot rest assembly 30 is mounted to the forward end frame members 16. The foot rest assembly 30 has a mounting block 32 and two pivotable foot rests 34 and 36. The mounting block 32 has a central portion 38 with two winged portions 40 and 42 extending at an angle A from each end of the central portion 38. The central portion 38 has a front-facing side 38a and a rear-facing side 38b. The angle A between the front-facing surface 38a and each adjacent wing portion 40 or 42 can be between 100 and 170 degrees. At least one bolt hole 44 extends through the body of the central portion 38 and is adapted to receive locking bolts or screws (not shown) that removably secure the central portion 38 to the horizontal connecting frame member 24 (see FIG. 6). Bolt holes (not shown) can be provided in the front-facing surface 24a of the horizontal connecting frame member 24 to receive the bolts that extend through the bolt holes 44. As best shown in FIG. 6, the rear-facing surface 38b of the mounting block 32 abuts the front-facing surface 24a of the horizontal connecting frame member 24 when the foot rest assembly 30 is installed on the horizontal connecting frame member 24. A cylindrical housing 46 and 48 is provided at the outward end of each winged portion 40 and 42, respectively, and each cylindrical housing 46 and 48 has a corresponding bore 50 and 52, respectively, extending therethrough.

Each foot rest 34 and 36 can have the same construction, and each has a vertical bar 54 that has a bottom end 60. The vertical bar 54 extends upwardly to a curved portion 56 that bends or curves for about ninety degrees to a horizontal section 58 that serves as a foot rest. Ridges 62 can be provided on the horizontal section 58 to provide friction for the sole of the rider's shoe. The bottom end 60 of each foot rest 34 and 36 is adapted to be inserted into a corresponding bore 50 and 52 of a corresponding cylindrical housing 46 and 48, respectively. Threaded fixing bolts 64 extend through threaded openings 66 in the wall of the cylindrical housings 46 and 48 to secure the vertical bar 54 of each foot rest 34, 36 at the desired angle, height or orientation.

The foot rest assembly 30 is installed to the horizontal connecting frame member 24 by securing the rear-facing surface 38b of the central portion 38 to the front-facing surface 24a of the horizontal connecting frame member 24 using securing bolts or screws. The bottom end 60 of each foot rest 34 and 36 is then inserted into the respective bores 50 and 52 of the respective cylindrical housing 46 and 48. The bolts 64 are then screwed into the threaded openings to secure the vertical bar 54 of each foot rest 34 and 36 inside the respective bore 50 and 52. The height and angle of each foot rest 34 and 36 can be adjusted by simply loosening the bolts 64 and adjusting (i.e., raising, lowering or pivoting) the foot rest 34 or 36.

The foot rest assembly 30 of the present invention provides a pair of symmetrically aligned and adjustable foot rests. The combined horizontal connecting frame member 24 and central portion 38 allows both foot rests 34 and 36 to be connected together to keep them symmetrical while allowing for individual adjustment of each foot rest. The foot rests 34 and 36 are fully and easily adjustable by simply slackening the bolts 64 to rotate the foot rest 34, 36 forward or backwards, as well as facilitating an up and down adjustment as needed. In addition, the position of the central portion 38 with respect to the frame 10 of the motorcycle provides clearance for the fork 26 and the fender 28. Without the interference of foot controls, brakes and the shifter, the foot rest assembly 30 allows the rider to reposition his/her feet without fear of accidentally knocking controls. Finally, when storing the motorcycle (or during transport), these foot rests 34 and 36 can be folded in to allow for several motorcycles to be stored or transported in close proximity.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A foot rest assembly for use with a motorcycle, comprising:
    a mounting block having a central portion that has opposite ends, and first and second winged portions extending at an angle from each end of the central portion, each winged portion having an outward end, and a cylindrical housing is provided at the outward end of each winged portion, with each cylindrical housing having a bore extending therethrough and at least one threaded opening provided in the cylindrical housing;
    first and second foot rests, each foot rest having a vertical bar that has a bottom end, with the vertical bar extending and being bent by about ninety degrees to a horizontal section;
    wherein the vertical bar of each foot rest is inserted into a corresponding one of the bores of the cylindrical housings, and a threaded bolt is screwed into the at least one threaded opening to secure each vertical bar inside each corresponding bore.

2. The assembly of claim 1, wherein ridges are provided on each horizontal section.

3. The assembly of claim 1, wherein the angle is between 100 and 170 degrees.

4. A motorcycle, comprising:
    a motorcycle frame that has a bracket, a horizontal frame member, and two forward end frame members that taper together upwardly and are held with the bracket relative to the horizontal frame member, with a horizontal connecting frame member extending between the two forward end frame members and having a front-facing surface, the motorcycle also having two forks that are secured to the motorcycle frame in a position that is forward of the two forward end frame members;
    the foot rest assembly of claim 1, wherein the central portion has a front-facing surface and a rear-facing surface, with the rear-facing surface secured to the front-facing surface of the horizontal connecting frame member.

5. The motorcycle of claim 4, wherein the angle is defined between each winged portion and the front-facing surface of the central portion, with the angle being between 100 and 170 degrees.

* * * * *